Figure 1:
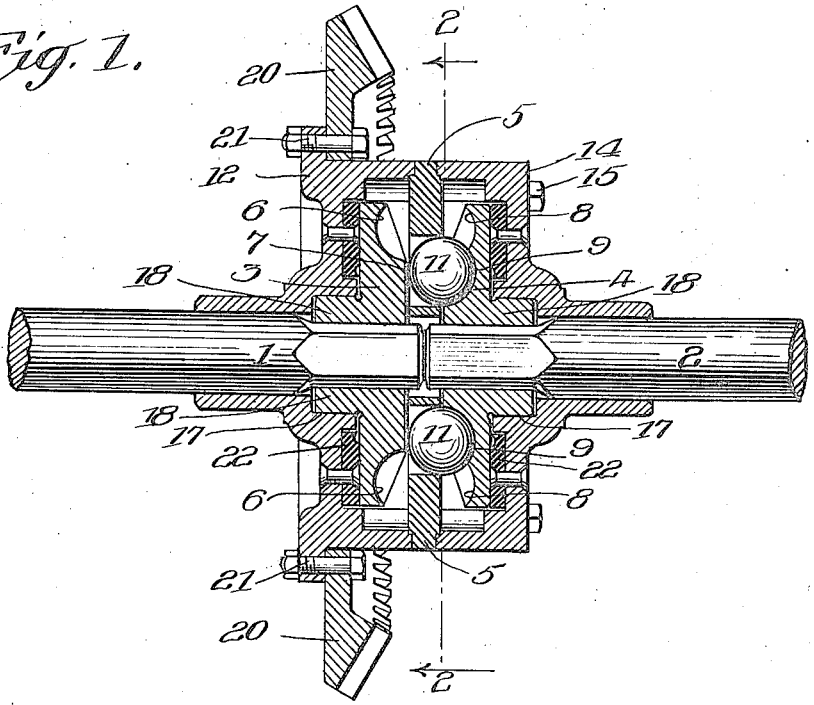

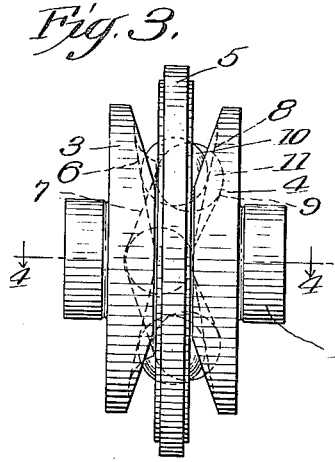
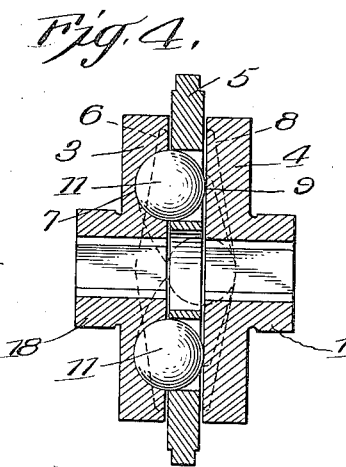
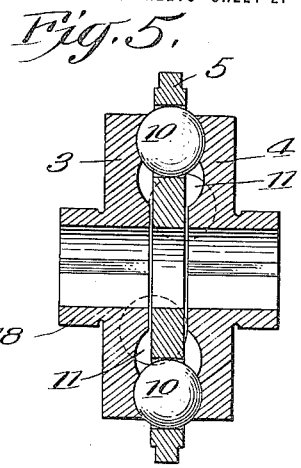
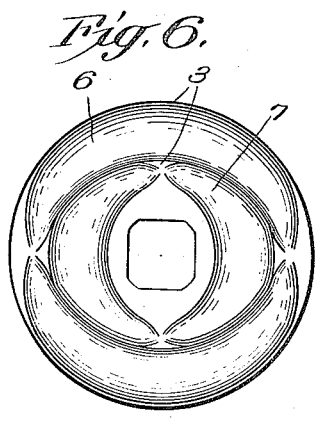
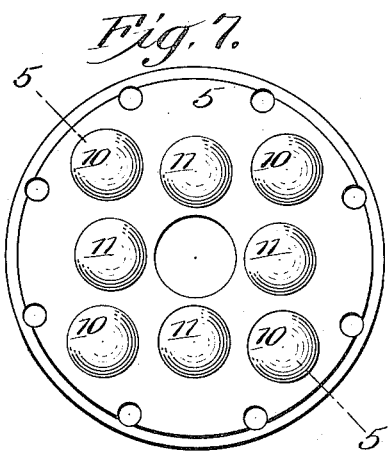
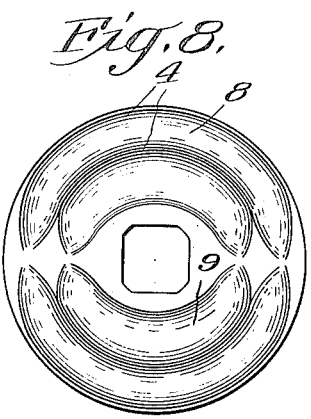
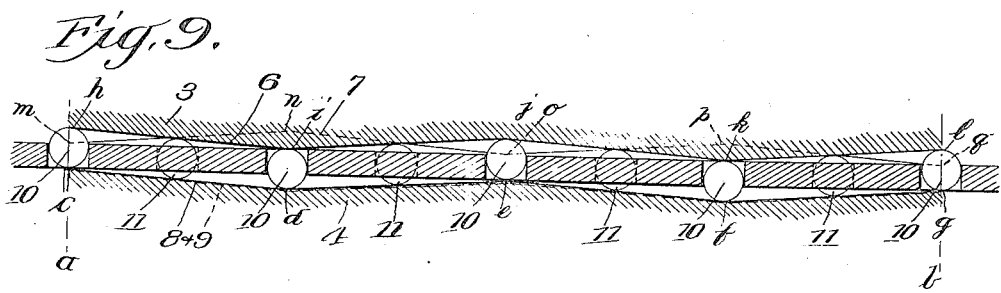

D. MILLER.
DIFFERENTIAL GEARING.
APPLICATION FILED JAN. 19, 1918.
1,282,614.
Patented Oct. 22, 1918.
3 SHEETS—SHEET 3.
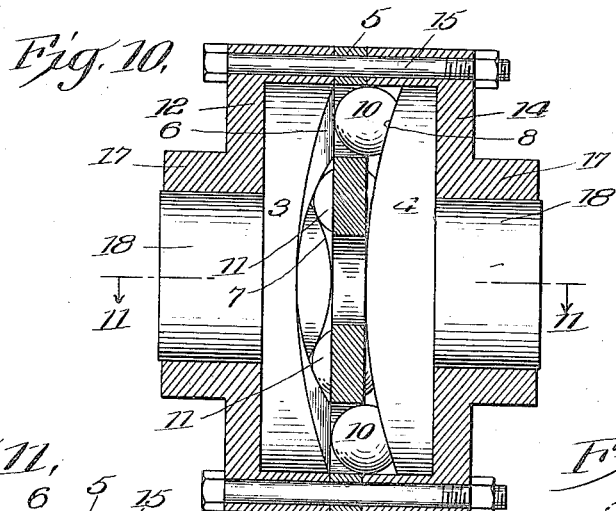
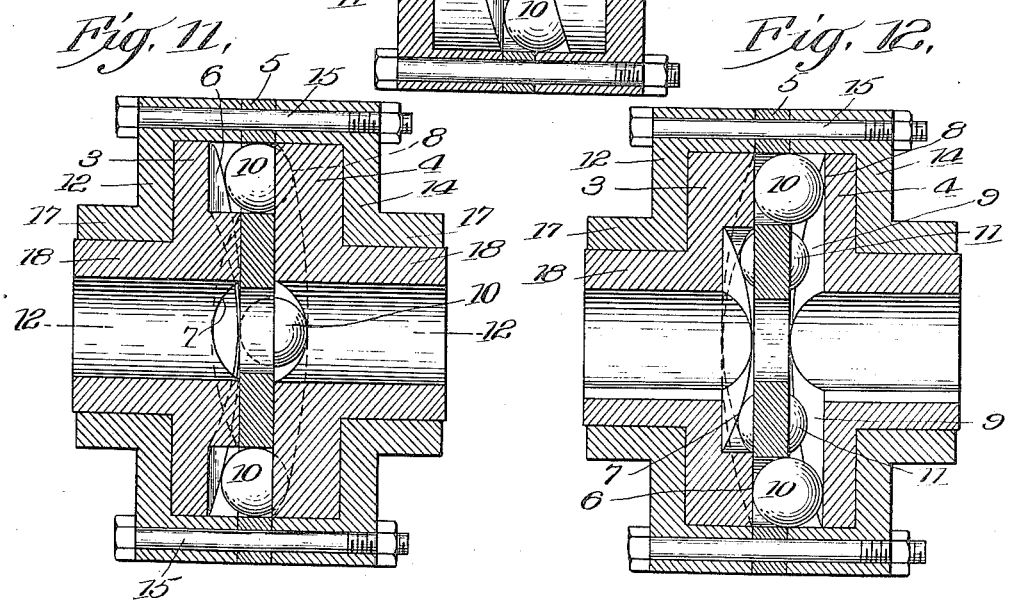
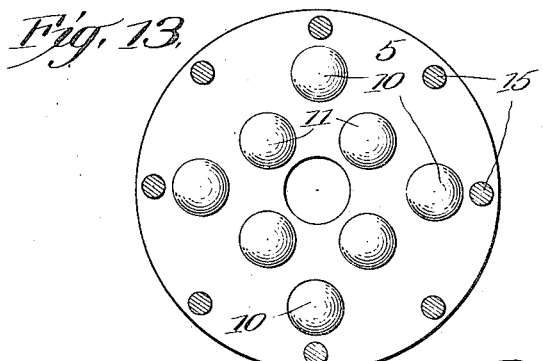
Inventor
Dorr Miller
By his Attorney
Alfred Wilkinson

UNITED STATES PATENT OFFICE.

DORR MILLER, OF CHICAGO, ILLINOIS.

DIFFERENTIAL GEARING.

1,282,614.  Specification of Letters Patent.  Patented Oct. 22, 1918.

Application filed January 19, 1918. Serial No. 212,567.

*To all whom it may concern:*

Be it known that I, DORR MILLER, a citizen of the United States, residing at Chicago, in the county of Cook and State of Illinois, have invented new and useful Improvements in Differential Gearing, of which the following is a specification.

My invention has for its object to produce a differential gearing for automobiles and other purposes, whereby the serious faults of the differentials now in common use shall be overcome.

The great defects of ordinary differentials relate to spinning. When either of the driving wheels begins to slip from loss of traction the driving motion will be diverted to that wheel and the power effective to propel the vehicle will be proportionate to the traction of this slipping wheel only.

In many instances it occurs that this effective propelling force is insufficient to move the vehicle with the result that the driving motion all goes to the slipping wheel and the power is there dissipated.

In my improved device this objection is overcome by introducing internal resistance. This results from the peculiar construction of my mechanism which consists essentially of two driven heads with the driving disk arranged between, the three arranged concentrically. The adjacent faces of the heads are formed with concentric cam grooves or cam surfaces inclined each from a low point to a high point. In openings in the disk are arranged clutching members or actuators, preferably in the form of balls, which are carried around in the disk but are free to move laterally, whereby they exercise their double function of engaging with the inclines to rotate the heads of the driven members and of exerting lateral thrust on the heads to force them into frictional engagement with the case. This affords a perfectly operating differential mechanism of strong and simple construction and easily made parts and this has the important advantage of preventing spinning under all circumstances, either straight driving or on a curve, for, when one wheel tends to slip this is resisted by the friction or internal resistance exerted on the case, and this resistance is proportioned to be sufficient to insure propelling of the vehicle.

As a result of this propelling power being transmitted through both wheels, the tendency of the vehicle to skid in turning of corners is overcome for the propelling forces are effective to straighten out the vehicle.

My new differential involves a new mechanical principle which I have discovered and applied, the same being two movable or rotatable elements provided with reversely inclined surfaces and an actuator arranged between the two elements and in contact with both inclined surfaces, whereby when one element is moved in one direction, power is applied thereby through the actuator to move the other element in the reverse direction. The result of this is a true differential action whose characteristic is that the advancing of one element with reference to the actuator will correspondingly retard the other element with relation to the actuator, so that the average speed of the two driven elements will at all times be equal to that of the actuator.

My invention will be better understood by reference to the drawing herewith in which various important constructional details are shown.

Figure 2:
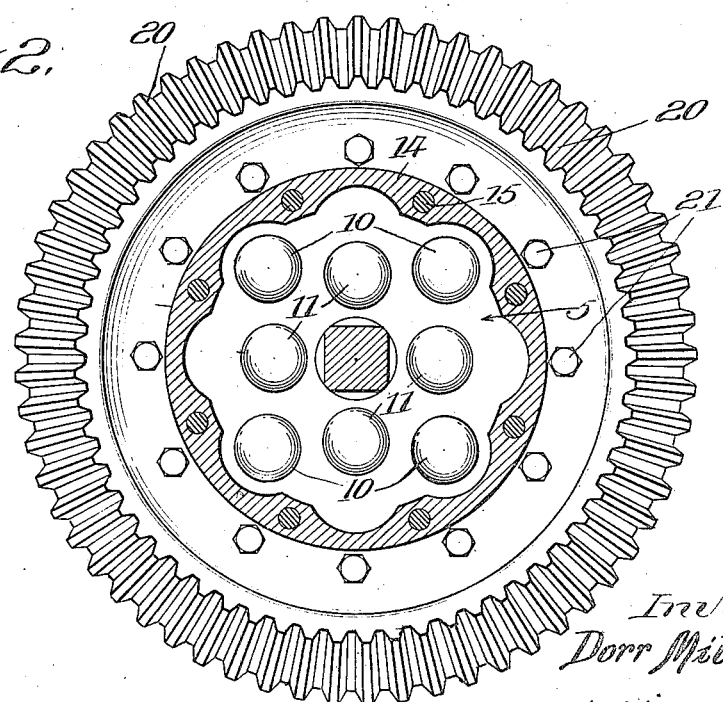

Figure 1 is a vertical longitudinal sectional view illustrating a preferred form of my invention. Fig. 2 is a cross-sectional view on line 2—2 of Fig. 1. Fig. 3 is a detail view showing certain of the parts in elevation with the housing or casing removed. Fig. 4 is a section taken approximately on line 4—4 of Fig. 3. Fig. 5 is a section on the line 5—5 of Fig. 7. Figs. 6, 7, and 8 are face views of the driving member and the driven or disk members, arranged in proper angular relation. Fig. 9 represents a development of the cam grooves on a plane. Fig. 10 is a view partly in section and partly in elevation of a modified form of my invention. Fig. 11 is a section taken on line 11—11 of Fig. 10. Fig. 12 is a section taken on line 12—12 of Fig. 11. Fig. 13 is a face view of the driving member and balls.

In the drawing 1 and 2 represent the two driven wheel axles suitably journaled in alinement and having their adjacent ends squared and to which are fitted respectively the driven members or heads 3 and 4. Between the heads is arranged the driving member 5 in the form of a disk carrying the cam groove engaging parts preferably in the form of balls 10, which are supported in suitable apertures therein and are carried around by the disk but are movable laterally with relation thereto.

The inner faces of the two heads are formed with a plurality of concentric cam grooves each having one or more high points and low points and gradually inclined from the low to the high. As here shown each head is provided with two cam grooves and at least two are desirable to keep up the continuity of movement as will be explained and understood.

On head 3, 6 indicates the outer cam groove and 7 the inner. On head 4, 8 indicates the outer cam groove and 9 the inner.

Some means must be provided for holding the parts together and therefore the driving member may conveniently be connected to or form part of a housing inclosing and forming a bearing for the meeting ends of the two driven members. In the arrangement shown, the driving member 5 is in the form of a disk somewhat larger in diameter than the heads on the driven members so as to permit an annular portion adjacent to the periphery thereof to be clamped between two cup-like housing members 12 and 14, by suitable bolts 15, passing through the members 12, 14 and 5 and tying them into a rigid closed housing divided into two compartments by the disk-like driving member. As shown, the housing members are provided with internal bearing surfaces, 17, providing journal bearings for the bearing portions 18 of the members 3 and 4. The housing member 12 is also provided with a radial flange to which the driving gear 20 is secured by means of bolts 21.

As here shown the high points of the cam grooves 8 and 9 are arranged to correspond, but the high points of the cam grooves 6 and 7 are displaced 90° with reference to each other. This 90° displacement is desirable for the sake of balance but this exact amount of displacement is not important. However it is important that at least in one head the high points of the two cams grooves should be displaced with reference to each other, that is should not be on the same radius, and that the high points of the cam grooves in the two heads should not be correspondingly arranged, otherwise, when the heads were turned with relation to each other, at one position there would be a position of parallelism of the walls of the grooves in which the high and low points corresponded in each and there would be a dead center at which the balls would slip past and the heads would not be turned.

The clutch members or actuators carried by the driven member 5 are in the form of balls each having a diameter equal to the distance or space between the corresponding points on the two opposite cam grooves when the two heads are so placed that the low points on one cam groove, for example the groove 6, are opposite the high points on the opposite cam groove, for instance groove 8. The balls are arranged in two groups the outer consisting of four balls 10 arranged 90° apart at a distance from the axis of rotation equal approximately to the distance therefrom to about the center line of the cam groove 6; and the inner set consisting of the four balls 11 spaced 90° apart, or otherwise suitably arranged, at a distance equal approximately to the distance therefrom of the center of the cam grooves 7 and 9. It is preferable that the balls of the respective groups should be displaced relatively to each other 45° as best shown in Fig. 4, so that the balls shall be arranged at sufficiently equal intervals around the circumference to bind on the high points or the inclines and rotate the driven members.

In each cam groove there may be only one high point, or more as convenient, and depending more or less on the length of the groove.

There must be two balls for each two high points, one operating as an actuator and the other as a spacer, to maintain the inclines in proper relation and prevent lost motion. The function of the parts obviously will be reversed when power is applied in the reverse direction.

The heads provided with cam grooves being set face to face give the reverse inclines which are necessary for results and the actuators operating against the cams produce the outward thrust which creates the friction on the case or collar bearing necessary for the resistance and for reaction on the other member. It is on this reaction that the delivery of power to the other members depends. The reaction is proportional to the angle of the cam surfaces, that is the less the angle the greater the reaction.

To obtain the requisite degree of internal resistance as a result of this lateral thrust produced by the driving pressure against the inclines of the cams I have provided the internal faces of the housing members 12 and 14 with suitable friction washers 22 secured in position by rivets 23. These washers may desirably be of cast iron with their inner or friction surfaces provided with oil grooves and engaging the outer surfaces of the steel heads 3 and 4 so as to interpose frictional resistance proportional to the driving pressure applied by the balls against the cams. It therefore results that the reactive pressure resulting from the resistance of the wheel of lesser traction is materially augmented and increased by the internal resistance set up by the lateral thrust and friction washers so that the propelling pressure imparted to the wheel of greater traction will be sufficient to move the vehicle.

My invention is simple so far as construction is concerned, but as a new principle is involved I have projected the cam grooves as in Fig. 9 to make clear their relation and the result obtained thereby.

Referring particularly to this figure, which is in the nature of a diagram, the length a—b of the diagram represents 360 degrees or the complete development of the cam-grooves. The undulating double line c—d—e—f—g represents the development of the cam grooves or surfaces 8 and 9 of the head 4. The undulating line h—i—j—k—l represents the development of the cam grooves or surfaces 6 of the head 3, and the undulating line m—n—o—p—q, that of the cam groove 7 which is also on the head 3. The cam surfaces 7 and 9 may be considered as lying beneath the cam surfaces 6 and 8; 8 and 9 being in the same plane are projected in a composite full and dotted line; the cam surface 7 is shown partially in dotted lines being beneath the surface 6. The clutch members 10 engage the surfaces 6 and 8 while the clutch members 11 engage the surfaces 7 and 9, the said clutch members being reciprocal in the openings formed in the driving member 5 as explained in the application.

In the position shown in the diagram, the high points of the cam surface 8 are opposite the low points of the cam surface 6 and the clutch members 10 lie between these points for this particular relative position of the cam surfaces and the two surfaces are substantially parallel. In this position of the heads 3 and 4 the high points of the surface 9 are opposite the high points of the surface 7; that is, these cam surfaces 7 and 9 are everywhere non-parallel or converging. At a point midway between the clutch members 10 the surfaces 7 and 9 are separated a distance appropriate to receive the clutch member 11. If either of the heads 3 or 4 were moved through 90° this relation would be reversed, that is, the cam surfaces 7 and 9 would be parallel and 6 and 8 would be non-parallel or converging. In every other position the cam surfaces of both pairs 6 and 8 and 7 and 9 are converging in one direction or the other at the points engaged by the clutch members 10 and 11. From this it will be seen that if the driving member 5 is at any time moved in either direction one or the other sets of clutch members will be forced against converging cam surfaces. It will also be obvious from the diagram that if either head is moved relatively to the other in either direction the points of the cam surfaces opposite the ends of the clutch members will be the proper distance apart to receive and engage the clutch members, provided the driving member which holds the clutch members is moved an amount equal to half the relative movement of said clutch members.

It will be noted that the cam surfaces 6, 7, 8 and 9 are formed as curved grooves, conforming to the peripheral contour of the balls, which provides an increased bearing or line contact surface between the balls and the driven heads so that the wear is negligible, particularly as the balls roll upon the cam surfaces without play when the cam surfaces are properly formed. As a contributary factor in obtaining this result I so construct the cams that the cam-ways formed by the coacting cams correspond in width to the diameter of the balls in the line of the axis of contact of the balls in all positions. As will be understood the axis of contact on the axial line through the points of contact will shift slightly owing to the undulating path of the camways and by so forming the grooves whereby the camways correspond in width to the diameter of the balls in the line of the axis of contact this shifting of the contact axis is compensated for in a manner at all times maintaining the proper width of the groove and thereby preventing backlash. As a result the operation is positive and uniform in the transmission of the motion.

In Figs. 10, 11, 12 and 13 I have shown a modified form of my invention wherein the additional frictional washers are omitted and the additional friction or internal resistance introduced results from the direct contact of the outer surfaces of the heads 3 and 4 with the internal surface of the housing. It will be understood, however, that such additional resistance while particularly desirable in transmitting additional propelling forces to the wheel of greater traction, is not essential to my improved differential action wherein the frictional wear and backlash of toothed gearing is obviated. In the modified form of the device shown the cam surfaces are shown of flat contour.

While I have shown desirable embodiments of my invention it will be understood that many modifications thereof can be made without departing from the spirit and scope thereof and it is therefore intended that all matter contained herein shall be interpreted as illustrative and not in a limiting sense.

This application is intended more fully to show and explain the invention of my application Ser. No. 13,616. This second application embodies the subject matter of the former and is intended as a continuation thereof.

I claim—

1. In a device of the character described, two alined driven members, a driving member lying between and co-axial with the driven members, each of the driven members having on the end adjacent to the driving member concentric, annular, undulating cam surfaces, and a plurality of groups of clutch devices carried by said driving member, the clutch devices of each group lying between corresponding cam surfaces on the two driven members, said clutch devices being movable relative to the driving member in a direction parallel with the axis of rotation and being held against movement relative to the driving member angularly of the axis of rotation.

2. In a device of the character described, two alined driven members, each of said members having on the face thereof adjacent to the other member a plurality of concentric, annular, undulating cam surfaces, the cam surfaces of the two members being similar to each other, the angular disposition of the cam surfaces on one member relative to each other being different from the angular disposition of the cam surfaces on the other member, a driving member lying between and co-axial with said driven members, and a plurality of groups of clutching devices carried by said driving member in position to coöperate with said cam surfaces, said clutching devices being rotatable with the driving member and being movable relative to the driving member in a direction parallel to the axis.

3. In a device of the character described, two alined driven members, each of said members having on the face thereof adjacent to the other member a plurality of concentric, annular, undulating cam surfaces, the cam surfaces of the two members being similar to each other, the angular disposition of the cam surfaces on one member relative to each other being different from the angular disposition of the cam surfaces on the other member, a driving member lying between and co-axial with said driven members, said driving member being provided with openings therethrough at a plurality of points between each pair of corresponding cam surfaces, and balls arranged in said openings, each ball being of a diameter sufficient to engage with both of the cam surfaces between which it lies in certain relative position of said driving members.

4. In a device of the character described, two alined members, each of said members having two concentric annular cam surfaces on the end adjacent to the other member, each of said cam surfaces having two high points located 180 degrees apart and two low points located 180 degrees apart and displaced 90 degrees with respect to the high points, corresponding points on the two cam surfaces on one of the members registering with each other angularly of the axis of rotation and corresponding points on the two cam surfaces on the other member being displaced 90 degrees from each other angularly of the axis of rotation, a driving member located between said driven members, said driving member having four openings through the same between two outer cam surfaces and four similar openings between the two inner cam surfaces, the openings of each group being spaced 90 degrees apart and the openings of one group being displaced 45 degrees with respect to the other group, and a ball loosely arranged in each of said openings adapted to engage with both of the cam surfaces between which it lies.

5. In a device of the character described, a rotary driving member, two rotary driven members, said driven members having a plurality of pairs of complementary undulating cam surfaces, and clutch elements associated with the driving member and interposed between the cam surfaces, the parts being constructed and arranged to permit the driving member to rotate the driven members in either direction at the same speed or differentially, with the driving member making the average speed of the driven members.

6. In a device of the character described, a rotary driving member, two rotary driven members, said driven members having a plurality of pairs of complementary undulating cam surfaces, and a plurality of groups of clutch elements rotatable with the driving member and interposed between said cam surfaces, the parts being constructed and arranged to permit the driving member to rotate the driven members in either direction at the same speed or differentially.

7. The combination with rotary driven members having two sets of opposed undulating clutch surfaces, set circumferentially in different relative positions, and a rotary driving member provided with at least two clutch elements, one working between each of said sets of opposed clutch surfaces and having a width less than the maximum but greater than the minimum distance between the opposed undulations of coöperating clutch surfaces.

8. The combination with two rotary driven members having two sets of opposed undulating cam surfaces, the cam surfaces on one member being set circumferentially in different relative positions than they are on the other member, a rotary driving member, and clutch elements rotatable with the driving member and interposed between the opposed cam surfaces, the parts being so proportioned and arranged that the driving member will actuate the driven members in either direction at the same speed or differentially.

9. In combination, a disk, two rotatable members lying on opposite sides of and co-axial with the disk, each of said members having a plurality of concentric undulating cam surfaces complementary to and facing those on the other member, the cam surfaces of one set being placed differently from those of the other set angularly of the axis of rotation, and cam-engaging members extending through openings in the disk and each engaging one cam surface on each side of the disk.

10. In a device of the character described, three alined rotatable members, each of the outer members having a plurality of concentric undulating cam surfaces complementary to and facing those on the other outer member, clutch elements rotatable with the middle member and each engaging with corresponding cam surfaces on the two outer members, and a holding device frictionally engaging the two outer members and holding them against spreading apart.

11. In combination, three members located adjacent to each other and movable relatively to each other in a predetermined direction, the outer of said members having cam surfaces and the inner member having a plurality of parts movable relatively thereto and engaging with the cam surfaces, the parts being so constructed and arranged that a movement in the direction of the length of said surfaces by either of said surfaces or said parts will produce a differential action between the three members.

12. In a device of the character described, a rotary driving member having opposed bearing surfaces, two rotary driven members journaled in axial alinement with the driving member and clutch members rotatively connected to the driving member and interposed between the driven members and adapted to act thereon to force the driven members into frictional engagement with the driving member and to permit of corresponding rotation of the driven members reversely with relation to the driving member for differential action substantially as described.

13. In a device of the character described, a rotary driving member suitably journaled and having opposed inwardly directed bearing surfaces, two rotary driven members journaled in axial alinement with the driving member and provided with disk flanges arranged between and to bear against the drive-member bearing surfaces, said disk flanges having cam surfaces formed on their opposed faces, and clutch members rotatively carried by the driving member and interposed between the disk flange cam surfaces to coact therewith to force the disks into frictional contact with the driving member, said cam surfaces being formed to permit of corresponding rotation of the driven members reversely with relation to the driving member for differential action substantially as described.

14. In a device of the character described the combination with a rotatable driving member, of a pair of rotatable driven members mounted coaxially with said driving member and having opposed cam surfaces formed thereon, clutch members rotatively secured to the driving member and interposed between said cam surfaces, the contours of said cam surfaces being such that they maintain engagement with said clutch members when the cam surfaces of the respective driven members are correspondingly revolved in opposite directions with relation to the clutch members, and said cam surfaces being arranged so that when the cam surfaces of one coacting pair are in parallel relation the cam surfaces of another co-acting pair shall be in non-parallel relation, and frictional bearing surfaces on the driving member arranged to be engaged by the driven members under the action of the cam surfaces, substantially as described.

15. A device of the character described having in combination three members located adjacent to each other and movable relative to each other about a common axis, the two outer members each having a plurality of cam surfaces facing and complemental to the other cam surfaces and arranged in the arc of a circle having its center at said axis, each of said surfaces rising gradually from two low points to two high points, coupling members carried by and movable with the intermediate member about said axis and shiftable relative to the intermediate member in the direction of said axis and each adapted for rotation about an axis perpendicular to said common axis to effect differential transmission and a drive member casing secured to the intermediate member and arranged to be frictionally engaged by the outer members under pressure of the cam surfaces in the axial direction so as to resist differential action.

16. A device of the character described having in combination three members located adjacent to each other and movable relative to each other about a common axis, the two outer members each having a plurality of cam surfaces facing and complemental to the other cam surfaces and arranged in the arcs of circles having their centers at said axis, each of said surfaces rising gradually from two low points to two high points, coupling members carried by and movable with the intermediate member about said axis and shiftable relative to the intermediate member in the direction of said axis and each adapted for rotation about an axis perpendicular to said common axis to effect differential transmission and a drive member casing secured to the intermediate member and arranged to be frictionally engaged by the outer members under pressure of the cam surfaces in the axial direction so as to resist differential action, and said balls being located between said cam surfaces and being spaced apart a distance equal to the distance from the low point on one of the cam surfaces to the high point thereof.

17. In a device of the character described, two alined driven members, a driving member lying between and co-axial with the driven members, each of the driven members having on the end adjacent to the driving member concentric, annular undulating cam surfaces, and a plurality of groups of clutch devices carried by said driving member, the clutch devices of each group lying between corresponding cam surfaces on the two driven members, said clutch devices being movable relative to the driving member in a direction parallel with the axis of rotation and being held against movement relative to the driving member angularly of the axis of rotation, and a drive member casing secured to the driving member and arranged to be frictionally engaged by the driven members under the lateral pressure of the cam surfaces to produce internal resistance to differential action, substantially as described.

18. In a device of the character described, two alined driven members, each of said members having on the face thereof adjacent to the other member a plurality of concentric annular, undulating cam surfaces, the cam surfaces of the two members being similar to each other, the angular disposition of the cam surfaces on one member relative to each other being different from the angular disposition of the cam surfaces on the other member, a driving member lying between and co-axial with said driven members, and a plurality of groups of clutching devices carried by said driving member in position to coöperate with said cam surfaces, said clutching devices being rotatable with the driving member and being movable relative to the driving member in a direction parallel to the axis, and a drive member casing secured to the driving member and arranged to be frictionally engaged by the driven members under the lateral pressure of the cam surfaces to provide internal resistance to differential action, substantially as described.

19. In a device of the character described, two alined driven members, each of said members having on the face thereof adjacent to the other member a plurality of concentric, annular undulating cam surfaces, the cam surfaces of the two members being similar to each other, the angular disposition of the cam surfaces on one member relative to each other being different from the angular disposition of the cam surfaces on the other member, a driving member lying between and co-axial with said driven members, said driving member being provided with openings therethrough at a plurality of points between each pair of corresponding cam surfaces, and balls arranged in said openings, each ball being of a diameter sufficient to engage with both of the cam surfaces between which it lies in certain relative position of said driving members, and a drive member casing secured to the driving member and arranged to be frictionally engaged by the driven members under the lateral pressure of the cam surfaces to produce internal resistance to differential action, substantially as described.

20. In a device of the character described, two alined members, each of said members having two concentric annular cam surfaces on the end adjacent to the other member, each of said cam surfaces having two high points located 180 degrees apart and two low points located 180 degrees apart and displaced 90 degrees with respect to the high points, corresponding points on the two cam surfaces on one of the members registering with each other angularly of the axis of rotation and corresponding points on the two cam surfaces on the other member being displaced 90 degrees from each other angularly of the axis of rotation, a driving member located between said driven members, said driving member having four openings through the same between the two outer cam surfaces and four similar openings between the two inner cam surfaces, the openings of each group being spaced 90 degrees apart and the openings of one group being displaced 45 degrees with respect to the other group, and a ball loosely arranged in each of said openings adapted to engage with both of the cam surfaces between which it lies, and a drive member casing secured to the driving member and arranged to be frictionally engaged by the driven members under the lateral pressure of the cam surfaces to produce internal resistance to differential action, substantially as described.

21. The combination with two rotary driven members having two sets of opposed undulating cam surfaces, the cam surfaces on one member being set circumferentially in different relative positions than they are on the other member, a rotary driving member, and clutch elements rotatable with the driving member and interposed between the opposed cam surfaces, the parts being so proportioned and arranged that the driving member will actuate the driven members in either direction at the same speed or differentially, and a drive member casing secured to the driving member and arranged to be frictionally engaged by the driven members under the lateral pressure of the cam surfaces to produce internal resistance to differential action, substantially as described.

22. In a device of the character described, a rotary driving member, two rotary driven members, said members having associated therewith a plurality of pairs of complementary undulating cam surfaces, and interposed clutch elements constructed and arranged to permit the driving member to move the driven members in either direction at the same speed or differentially and a drive member casing secured to the driving member and arranged to be frictionally engaged by the driven members under lateral pressure of the cam surfaces to produce internal resistance to differential action, substantially as described.

23. In combination, three alined rotatable members, each of the outer members having a plurality of concentric undulating cam surfaces complementary to and facing those on the other outer member, and a plurality of clutch members mounted on the intermediate member so as to be rotatable therewith and be movable relatively thereto in the axial direction, each of the clutch elements being interposed between and engaging two opposing cam surfaces on the outer members, and a drive member casing secured to the intermediate member and arranged to be frictionally engaged by the outer members under pressure of the cam surfaces in the axial direction so as to resist differential action.

24. In a device of the character described, two alined driven members, each of said members having on the face thereof adjacent to the other member a plurality of concentric, annular undulating cam surfaces, the cam surfaces of the two members being similar to each other, the angular disposition of the cam surfaces on one member relative to each other being different from the angular disposition of the cam surfaces on the other member, a driving member lying between and co-axial with said driven members, said driving member being provided with openings therethrough at a plurality of points between each pair of corresponding cam surfaces, and balls arranged in said openings, each ball being of a diameter sufficient to engage with both of the cam surfaces between which it lies in certain relative position of said driving members, and a drive member casing secured to the driving member and arranged to be frictionally engaged by the driven members under the lateral pressure of the cam surfaces to produce internal resistance to differential action substantially as described.

25. In combination, two alined rotatable members, a disk arranged between the ends of said members, each member having on the inner end a disk, the two latter disks each having a plurality of concentric undulating cam surfaces complementary to and facing those on the other, clutch elements rotatable with the middle disk and each engaging with corresponding cam surfaces on the two outer members, and a housing device attached to the central disk and engaging with the outer faces of the two other disks to prevent them from spreading apart and adapted frictionally to resist the differential action under pressure of the cams.

26. In combination, three alined rotatable members, each of the outer members having a plurality of concentric undulating cam surfaces complementary to and facing those on the other outer member, the cam surfaces of one set being placed differently angularly of the axis of rotation than are those of the other set, and balls carried by the intermediate member and engaging with all of said cam surfaces, said balls being movable with said intermediate member about the axis of rotation and being movable relatively to said intermediate member in the direction of said axis and a drive member casing secured to the intermediate member and arranged to be frictionally engaged by the outer members under pressure of the cam surfaces in the axial direction so as to resist differential action.

27. In combination, three members located adjacent to each other and movable relatively to each other about a common axis, the two outer members each having a plurality of cam surfaces and complemental to the cam surfaces of the other member and said cam surfaces being arranged in the arc of a circle having its center at said axis, each of said surfaces rising gradually from two low points to two high points, and clutch elements carried by and movable with the intermediate member about said axis, and movable relatively to the intermediate member in a direction parallel with said axis, said elements being located between said cam surfaces and being spaced apart a distance equal to the distance between one of the low points on one of the cam surfaces and a high point on the same cam surface and a drive member casing secured to the intermediate member and arranged to be frictionally engaged by the outer members under pressure of the cam surfaces in the axial direction so as to resist differential action.

28. In combinaton three members located adjacent to each other and movable relatively to each other about a common axis, the two outer members each having a plurality of cam surfaces and complemental to the cam surfaces of the other member, said cam surfaces being arranged in the arc of a circle having its center at said axis, each of said surfaces rising gradually from two low points to two high points, clutch balls carried by and movable with the intermediate member about said axis and movable relatively to the intermediate member in the direction of said axis, said balls being located between said cam surfaces and being spaced apart a distance equal to the distance from one of the low points on one of the cam surfaces to one of the high points on the same cam surface and a drive member casing secured to the intermediate member and arranged to be frictionally engaged by the outer members under pressure of the cam surfaces in the axial direction so as to resist differential action.

29. In a device of the character described, the combination with a driving member suitably journaled, driven members journaled coaxially therewith and on opposite sides of the driving member, laterally acting cam surfaces and coupling balls associated therewith and operative to couple the drive member to the driven members in both directions of rotation, a drive member casing secured to said driving member and arranged to be frictionally engaged by the driven members under pressure of the cam surfaces in the axial direction, substantially as described.

30. In a device of the character described, the combination with a driving member suitably journaled, driven members journaled co-axially and on opposite sides of the driving member and laterally acting cam surfaces and coupling balls associated therewith and adapted to couple the driving member to the driven members on both forward or reverse rotation of the driving member, said balls being rotatively secured to the driving member and capable of being rotated about their individual radial axes to permit rotation of the driven members relative to the driving member.

In testimony whereof I have signed my name to this specification.

DORR MILLER.